US012333877B2

(12) United States Patent
Huang

(10) Patent No.: US 12,333,877 B2
(45) Date of Patent: Jun. 17, 2025

(54) AUTHORIZATION AND UNLOCKING METHOD AND SYSTEM FOR A DOOR LOCK, ELECTRONIC DEVICE, AND COMPUTER-READABLE STORAGE MEDIUM

(71) Applicant: Nanning FuLian FuGui Precision Industrial Co., Ltd., Nanning (CN)

(72) Inventor: Jian-You Huang, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 119 days.

(21) Appl. No.: 18/241,485

(22) Filed: Sep. 1, 2023

(65) Prior Publication Data

US 2025/0078596 A1 Mar. 6, 2025

(51) Int. Cl.

| | |
|---|---|
| ***G07C 9/00*** | (2020.01) |
| ***G07C 9/25*** | (2020.01) |
| ***G07C 9/27*** | (2020.01) |
| ***G07C 9/29*** | (2020.01) |

(52) U.S. Cl.

CPC ..... *G07C 9/00817* (2013.01); *G07C 9/00563* (2013.01); *G07C 9/00571* (2013.01); *G07C 9/25* (2020.01); *G07C 9/27* (2020.01); *G07C 9/29* (2020.01); *G07C 2009/00587* (2013.01); *G07C 2009/00825* (2013.01)

(58) Field of Classification Search

CPC ........ G07C 9/00; G07C 9/00817; G07C 9/22; G07C 9/24; G07C 9/27; G07C 9/29; G07C 9/00563; G07C 9/00571; G07C 2009/00587; G07C 2009/00825

USPC ........................................................... 70/264

See application file for complete search history.

(56) References Cited

U.S. PATENT DOCUMENTS

| | | | | | |
|---|---|---|---|---|---|
| 1,938,150 | A * | 12/1933 | Marateck | G07C 9/0069 | 70/278.7 |
| 5,796,338 | A * | 8/1998 | Mardirossian | G08B 21/0247 | 340/539.1 |
| 6,577,239 | B2 * | 6/2003 | Jespersen | G08B 13/1418 | 340/568.1 |
| 6,836,212 | B2 * | 12/2004 | Sawinski | G08B 13/1409 | 340/568.1 |
| 6,989,748 | B2 * | 1/2006 | Rabanne | G08B 21/0269 | 340/572.1 |

(Continued)

FOREIGN PATENT DOCUMENTS

| | | |
|---|---|---|
| TW | I382118 B | 1/2013 |
| TW | I570315 B | 2/2017 |

(Continued)

*Primary Examiner* — Nathan Cumar

(74) *Attorney, Agent, or Firm* — ScienBiziP, P.C.

(57) ABSTRACT

An authorization and unlocking method for a door lock is disclosed. A device binding operation is performed to bind a digital key to a digital door lock. The digital key is unlocked. The digital door lock is activated when the digital key is inserted into the digital door lock. It is determined whether the digital key is bound to the digital door lock. A network link between the digital door lock and the digital key is established if the digital key is bound to the digital door lock. It is determined whether the digital door lock is authorized by a remote authorization server. An unlock operation is performed on the digital door lock if the digital door lock is authorized by the remote authorization server.

9 Claims, 7 Drawing Sheets

(56) References Cited

U.S. PATENT DOCUMENTS

| | | | | |
|---|---|---|---|---|
| 7,076,238 | B2 * | 7/2006 | Matsumoto | H04L 63/0428 455/410 |
| 7,106,171 | B1 * | 9/2006 | Burgess | G07C 9/00182 340/426.36 |
| 7,340,215 | B2 * | 3/2008 | Yokoshi | H04M 1/72457 455/410 |
| 7,378,939 | B2 * | 5/2008 | Sengupta | H04W 12/06 455/26.1 |
| 7,526,295 | B2 * | 4/2009 | Khare | H04L 63/0846 455/425 |
| 7,973,657 | B2 * | 7/2011 | Ayed | G08B 21/0277 340/539.11 |
| 8,498,618 | B2 * | 7/2013 | Ben Ayed | H04W 12/06 455/418 |
| 11,443,577 | B2 * | 9/2022 | Myers | G07C 9/20 |
| 2005/0280546 | A1 * | 12/2005 | Ganley | G08B 13/1427 340/539.23 |
| 2006/0083187 | A1 * | 4/2006 | Dekel | H04L 63/0853 370/310 |
| 2006/0199538 | A1 * | 9/2006 | Eisenbach | H04L 63/0428 455/41.2 |
| 2007/0296545 | A1 * | 12/2007 | Clare | G07C 9/00571 340/5.64 |
| 2009/0093215 | A1 * | 4/2009 | Eisenbach | H04W 12/08 455/41.2 |
| 2009/0256676 | A1 * | 10/2009 | Piccirillo | G07C 9/00309 340/5.65 |
| 2010/0019920 | A1 * | 1/2010 | Ketari | G08B 21/0213 340/686.6 |
| 2010/0022217 | A1 * | 1/2010 | Ketari | H04M 1/6066 455/411 |
| 2012/0019361 | A1 * | 1/2012 | Ben Ayed | H04W 12/068 340/5.83 |
| 2012/0019379 | A1 * | 1/2012 | Ben Ayed | G06F 21/32 340/5.82 |
| 2013/0298208 | A1 * | 11/2013 | Ayed | G06F 21/43 375/259 |
| 2014/0033774 | A1 * | 2/2014 | Ofchus | G07C 9/00571 70/264 |
| 2015/0007619 | A1 * | 1/2015 | Finney | E05B 47/00 70/264 |
| 2017/0236350 | A1 * | 8/2017 | Lin | G07C 9/00309 340/5.61 |
| 2022/0327877 | A1 * | 10/2022 | Pukari | G07C 9/00182 |
| 2023/0120520 | A1 * | 4/2023 | Pukari | G07C 9/00722 70/276 |

FOREIGN PATENT DOCUMENTS

| | | | |
|---|---|---|---|
| TW | I731830 | B | 6/2021 |
| WO | 2022167849 | A1 | 8/2022 |

* cited by examiner

AUTHORIZATION AND UNLOCKING METHOD AND SYSTEM FOR A DOOR LOCK, ELECTRONIC DEVICE, AND COMPUTER-READABLE STORAGE MEDIUM

FIELD

The disclosure relates to an unlocking method, and more particularly to an authorization and unlocking method and system for a door lock, an electronic device, and a computer-readable storage medium.

BACKGROUND

A traditional door lock is mainly unlocked through the key mechanism, and, however, now digital door locks are popular and accepted by consumers. There are two mainstream unlocking methods for the digital door locks, including physical identification, such as keys, cards and passwords, and biometric identification, such as fingerprints, iris, and facial recognition.

Regarding the traditional door lock and the digital door lock with the physical identification, if the key is lost or the password is leaked, there will be a risk of theft. With regard to biometric identification, the identification function is usually implemented on the digital door lock, which can be opened by forgery. In addition, most digital door locks are battery-powered, and cannot be used if the battery is dead.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
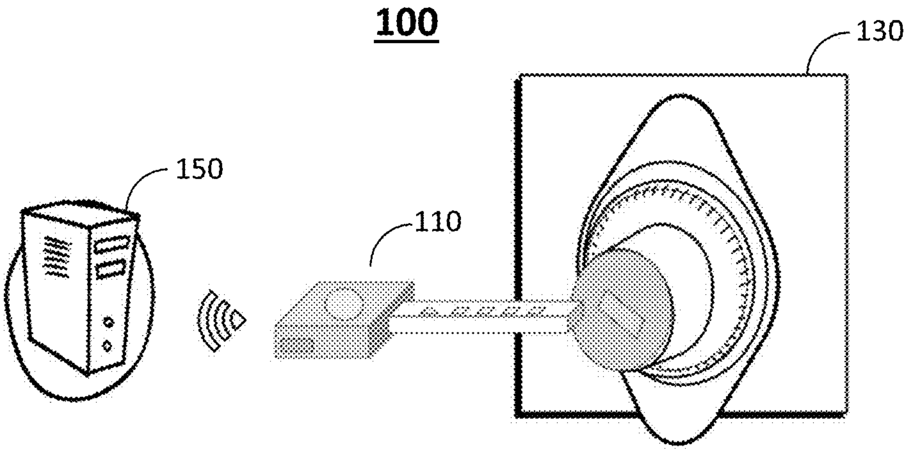
FIG. 1 is a schematic diagram of an embodiment of an authorization and unlocking system for a door lock of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

Figure 2:
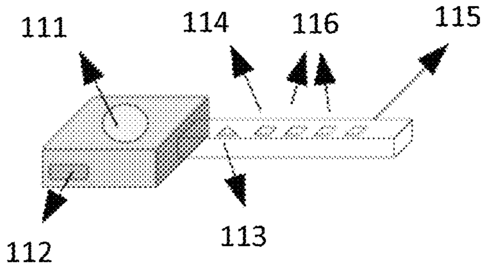
FIG. 2 is a schematic diagram illustrating a digital key according to an embodiment of a digital lock of the present disclosure.

FIG. 1 is a schematic diagram of an embodiment of an authorization and unlocking system for a door lock of the present disclosure. FIG. 2 is a schematic diagram of an embodiment of a digital key of the present disclosure.

An embodiment of an authorization and unlocking system for a door lock comprises a digital key 110, a digital lock 130 and a remote authorization server 150. The digital key 110 comprises a biometric element 111, a charging hole 112, a positioning point 113 and metal contacts 114, 115 and 116.

The biometric element 111 is configured to activate the digital key 110 and identify users. The biometric identification may be fingerprint recognition, iris recognition, facial recognition, and other technologies. The charging hole 112 charges the digital key 110. In addition to contact charging, wireless charging can also be accepted. The positioning point 113 confirms that the digital key 110 has been completely inserted into the digital door lock 130. When the digital key 110 is inserted into the digital door lock 130, the protruding positioning point 113 triggers the mechanism in the digital door lock 130, and the digital key 110 can be rotated by the user.

The metal contact 114 represents a ground (GND). The metal contact 115 represents a current condenser (VCC). The metal contacts 114 and 115 are mainly used to supply power to the charging hole 112. The metal contact point 116 is used to transmit data between the digital key 110 and the digital door lock 130. The digital key 110 also provides a slot for inserting a subscriber identity module (SIM) card to provide mobile network access.

Figure 3:
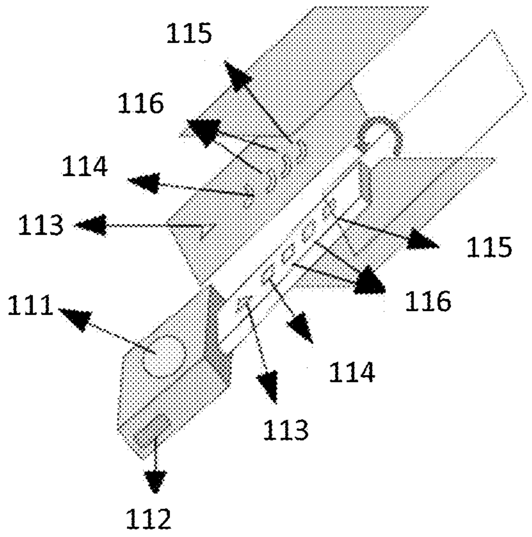
FIG. 3 is a schematic diagram of an embodiment of a digital key inserting the digital lock of the present disclosure.

FIG. 3 is a schematic diagram of an embodiment of a digital key inserting the digital lock of the present disclosure.

An inner side of the digital door lock 130 has a row of metal shrapnel used to obtain power and transmit data. When the digital key 110 is inserted into the digital door lock 130, it must be rotated to touch the metal shrapnel. The interior of the digital door lock 130 has a snap button. When the digital key 110 is completely inserted into the digital door lock 130, the positioning point 113 is pressed to the snap button, and the digital key 110 can be rotated.

Referring to FIG. 1, the remote authorization server 150 can store binding data and provide unlocking authorization.

The digital key 110 must be bound with the digital door lock 130 before being used. In addition to one copy of the binding data being stored in the digital key 110 and the digital door lock 130, a copy is also stored in the remote authorization server 150.

In an embodiment, a digital key can only be bound to one digital door lock, while a digital door lock can be bound to multiple digital keys.

When the digital key 110 is bound to the digital door lock 130, and the digital key 110 is inserted and the digital door lock 130 is activated, the digital door lock 130 starts to interact with the remote authorization server 150. When it is confirmed that the digital key 110 is authorized, the digital door lock 130 is activated by the digital key 110.

Figure 4:
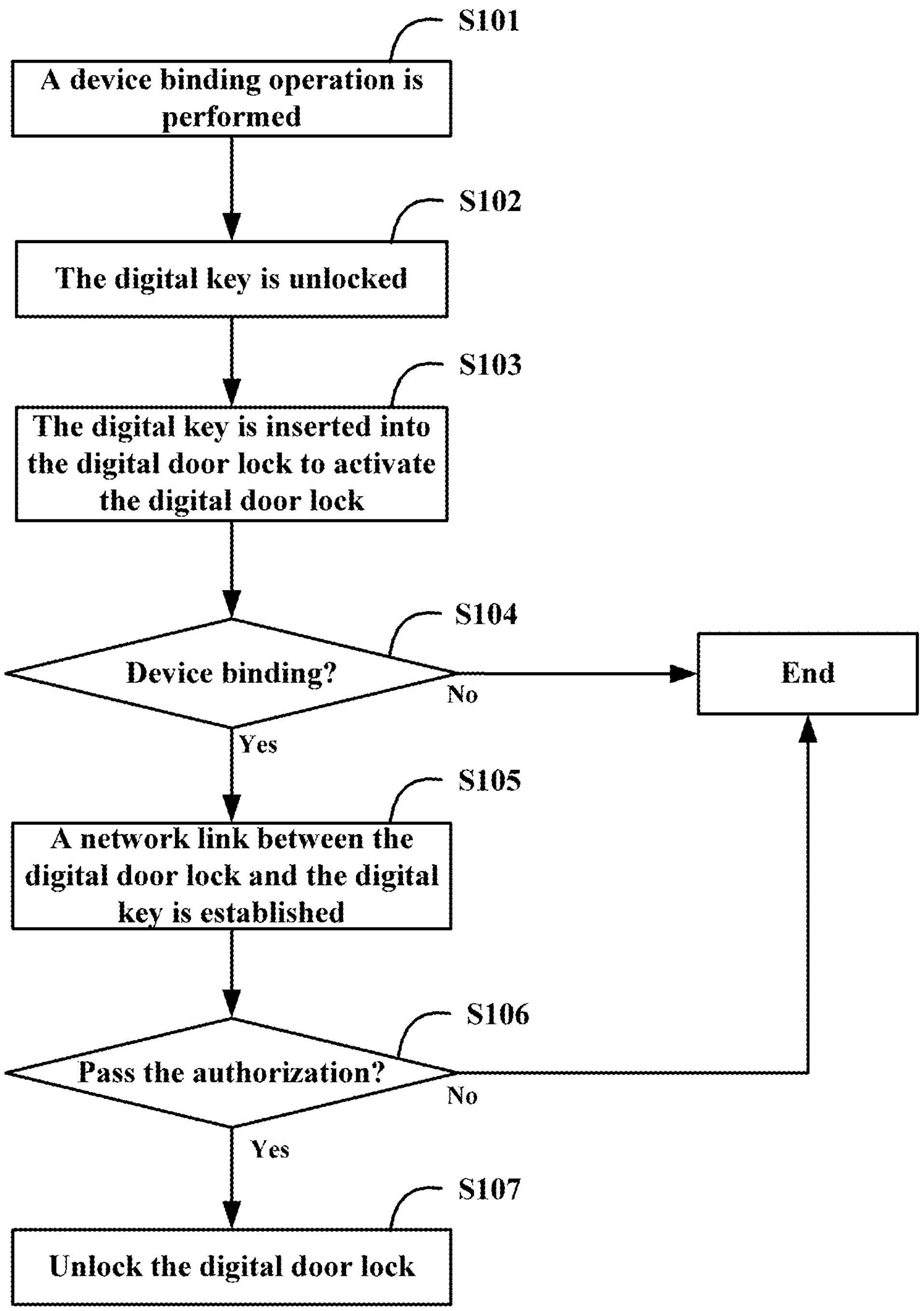
FIG. 4 is a flowchart of an embodiment of an authorization and unlocking method for a door lock of the present disclosure.

FIG. 4 is a flowchart of an embodiment of an authorization and unlocking method for a door lock of the present disclosure. According to different needs, the order of the steps in the flowchart can be changed, and some steps can be omitted.

In step S101, a device binding operation is performed. Before use, the digital key 110 and the digital door lock 130 need to be bound. The device binding operation only needs to be completed when the device is first used.

In step S102, the digital key 110 is unlocked. It should be noted that before the digital key 110 is inserted into the digital door lock 130, the digital key 110 must be activated through biometric identification and can only be activated when the identification is successful.

The digital key 110 is unlocked through the biometric identification. The biometric identification technology can be any of the following: fingerprint identification, iris identification, face identification and voiceprint identification. In addition to the biometric identification, the digital key 110 can also be unlocked with a password. After unlocking, the digital key 110 enters an unlocking mode.

In step S103, the digital key 110 is inserted into the digital door lock 130 to activate the digital door lock 130. The digital key 110 is inserted into the digital door lock 130 and is rotated, after confirming the location, to activate the digital door lock 130.

In step S104, it is determined whether the device binding operation has been completed. The digital door lock 130 is activated and then confirm whether the inserted digital key 110 is a bound device. If the digital key 110 is not a bound device, the flow of the method is terminated.

In step S105, if the digital key 110 is a bound device, a network link between the digital door lock 130 and the digital key 110 is established.

In step S106, it is determined whether the digital door lock 130 has passed the authorization of the remote authorization server 150. As the network link between the digital door lock 130 and the digital key 110 has been established, the digital door lock 130 is going to be authorized by the remote authorization server 150. If the authorization fails, the flow of the method is terminated.

In step S107, if the authorization is successful, the digital door lock 130 is unlocked. When the digital door lock 130 is authorized by the remote authorization server 150, the remote authorization server 150 notifies the digital door lock 130 to be unlocked.

Figure 5:
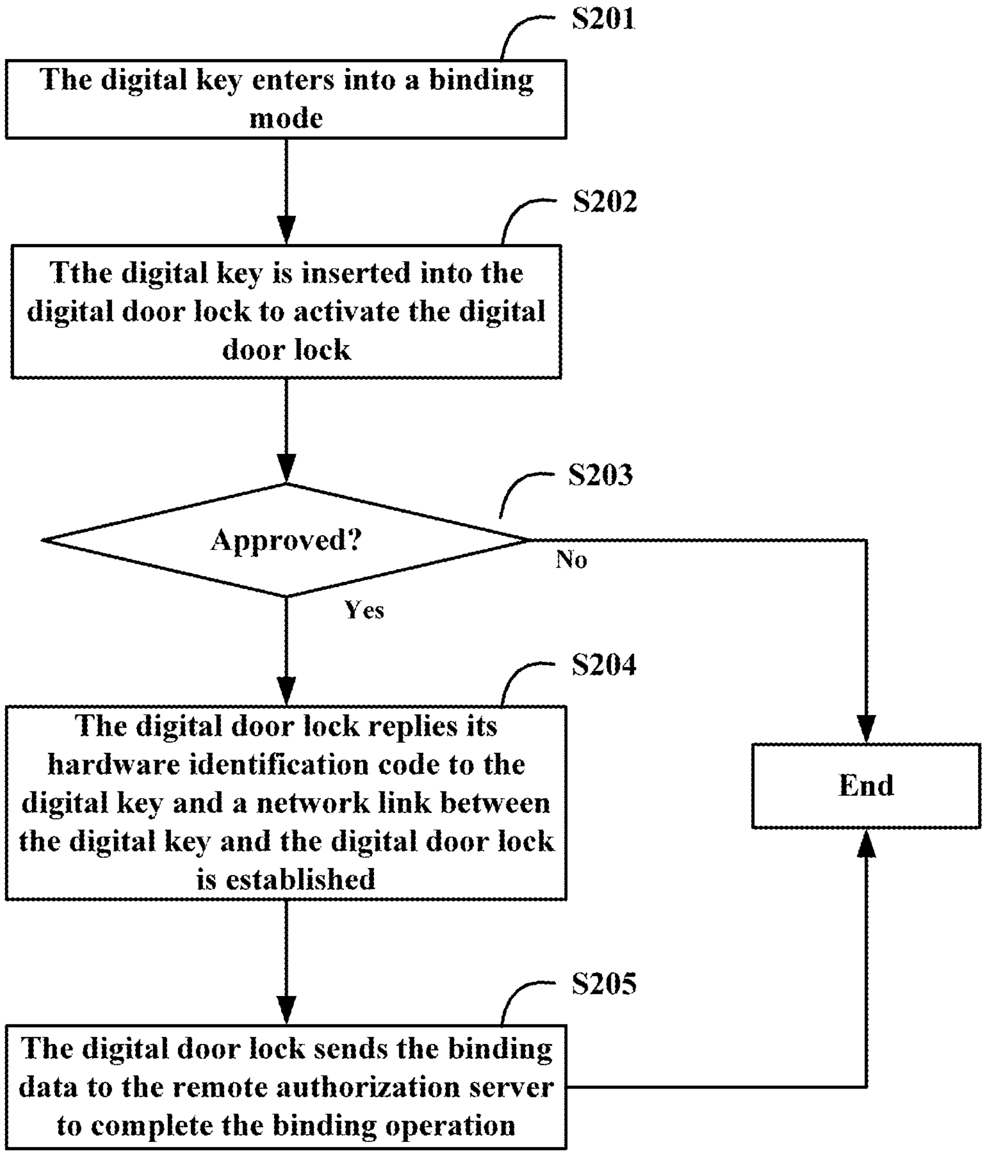
FIG. 5 is a flowchart of an embodiment of device binding of the present disclosure.

FIG. 5 is a flowchart of an embodiment of device binding of the present disclosure.

In step S201, a start button (not shown) of the digital key 110 is pressed and held for a fixed time, for example, 10 seconds, so that the digital key 110 enters into a binding mode.

In step S202, the digital key 110 is inserted into the digital door lock 130 to activate the digital door lock 130.

In step S203, the digital door lock 130 determines whether the digital key 110 is approved. The digital door lock 130 determines whether the digital key 110 is approved. The digital door lock 130 determines whether the digital key 110 is an approved device according to a hardware identification code (a first hardware identification code) of the digital key 110, for example, whether the digital key 110 and the digital door lock 130 are produced with the same manufacturer. If the digital key 110 is not an approved device, the flow of the method is terminated.

In step S204, if the digital key 110 is approved, the digital door lock 130 replies its hardware identification code (a second hardware identification code) to the digital key 110 and a network link between the digital key 110 and the digital door lock 130 is established.

In step S205, as the network link between the digital key 110 and the digital door lock 130 has been established, the digital door lock 130 sends the binding data to the remote authorization server 150 to complete the binding operation. The binding data includes the first hardware identification code and the second hardware identification code. The remote authorization server 150 receives the binding data and responds with a binding code to the digital door lock 130. The digital door lock 130 stores the binding code and transmits the binding code to the digital key 110, and then the flow of the method is terminated.

Figure 6:
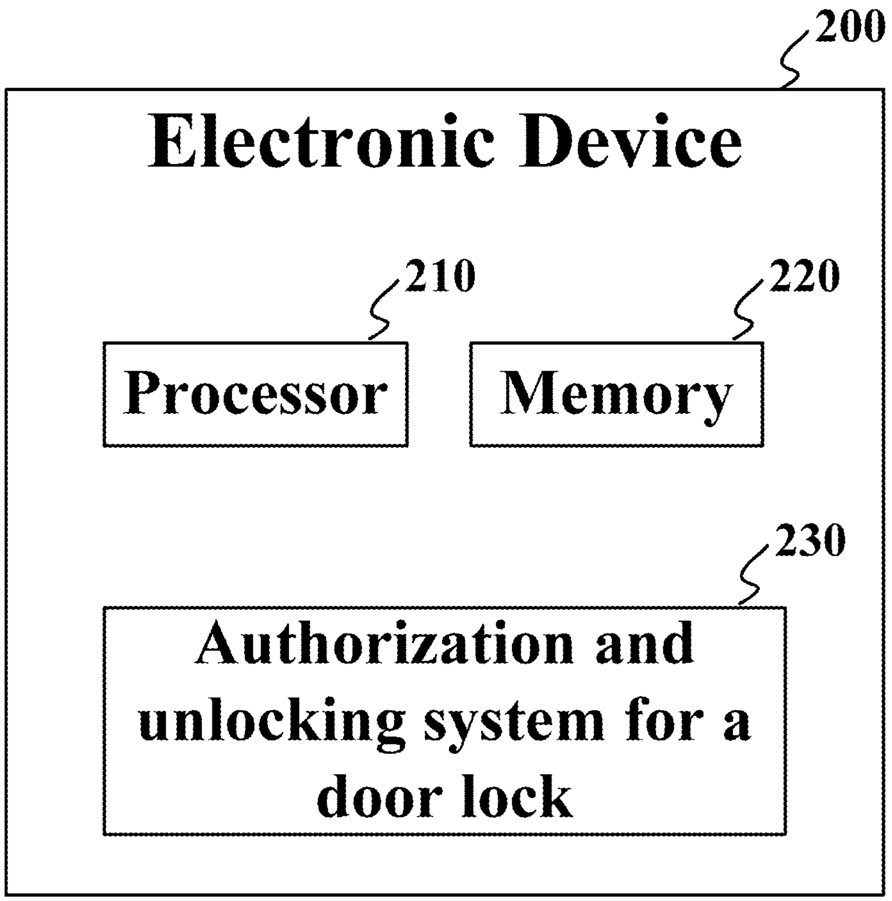
FIG. 6 is a block diagram of an embodiment of the hardware architecture of an electronic device using the method of the present disclosure.

FIG. 6 is a block diagram of an embodiment of the hardware architecture of an electronic device using the authorization and unlocking method for a door lock of the present disclosure. The electronic device 200 may be, but is not limited to, connected to a processor 210, a memory 220, and an authorization and unlocking system for a door lock 230 via system buses. The electronic device 200 shown in FIG. 6 may include more or fewer components than those illustrated or may combine certain components.

The memory 220 stores a computer program, such as the authorization and unlocking system for a door lock 230, which is executable by the processor 210. When the processor 210 executes the authorization and unlocking system for a door lock 230, the blocks in one embodiment of the booting mode configuration method applied in the electronic device 200 are implemented, such as blocks S101 to S107 shown in FIG. 4 and blocks S201 to S205 shown in FIG. 5.

It will be understood by those skilled in the art that FIG. 6 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the authorization and unlocking system for a door lock 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The authorization and unlocking system for a door lock 230 can be partitioned into one or more modules/units that are stored in the memory 220 and executed by the processor 210. The one or more modules/units may be a series of computer program instructions capable of performing particular functions of the authorization and unlocking system for a door lock 230.

Figure 7:
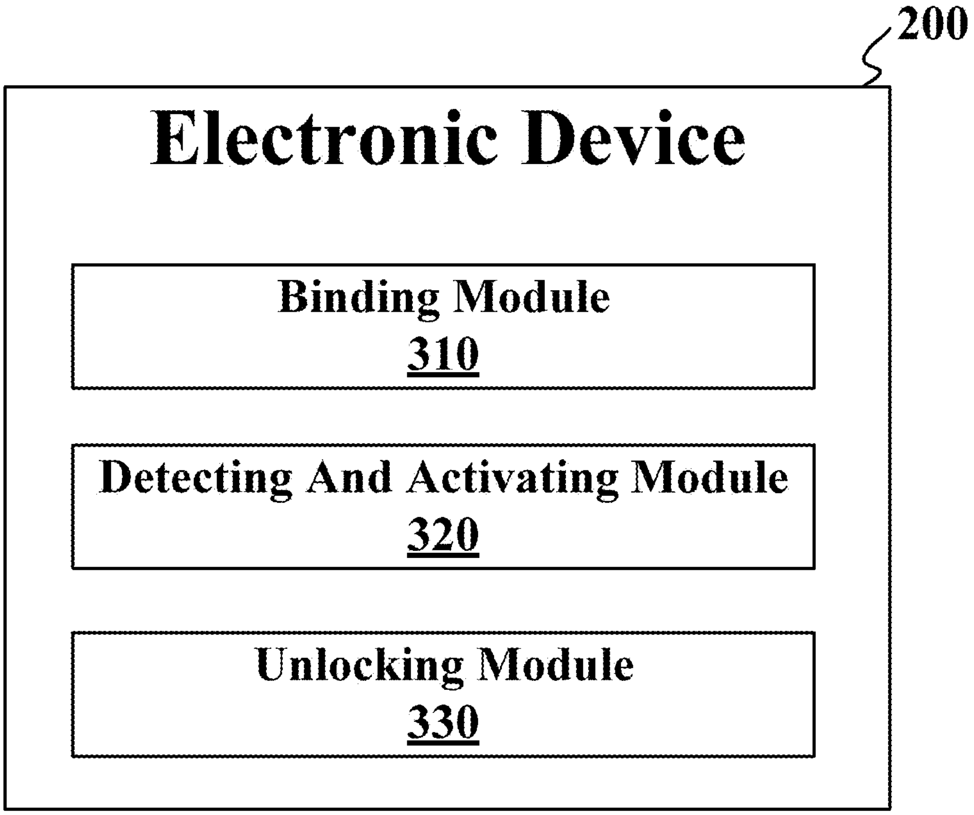
FIG. 7 is a block diagram of an embodiment of functional blocks of an electronic device of the present disclosure.

FIG. 7 is a schematic diagram of an embodiment of functional blocks of the electronic device using the method of the present disclosure.

The electronic device 200 comprises a binding module 310, a detecting and activating module 320 and an unlocking module 330.

The binding module 310 performs a device binding operation to bind the digital key 110 with the digital door lock 130.

The detecting and activating module 320 detects that the digital key 110 is inserted into the digital door lock 130 and activates the digital door lock 130. It should be noted that before the digital key 110 is inserted into the digital door lock 130, the digital key 110 must be activated through biometric identification and can only be activated when the identification is successful. The digital key 110 is unlocked through the biometric identification. The biometric identification technology can be any of the following: fingerprint identification, iris identification, face identification and voiceprint identification. In addition to the biometric identification, the digital key 110 can also be unlocked with a password. After unlocking, the digital key 110 enters an unlocking mode.

The detecting and activating module 320 determines whether the digital key 110 is a bound device. If the digital key 110 is a bound device, a network link between the digital door lock 130 and the digital key 110 is established.

The unlocking module 330 determines whether the digital door lock 130 is authorized by the remote authorization server 150. After the network link between the digital door lock 130 and the digital key 110 has been established, the digital door lock 130 is authorized by the remote authorization server 150.

If the authorization is successful, the unlocking module 330 performs an unlocking operation on the digital door lock 130. When the digital door lock 130 is authorized by the remote authorization server 150, the remote authorization server 150 notifies the digital door lock 130 to be unlocked.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An authorization and unlocking method for a digital door lock executable by an electronic device, comprising:

performing a device binding operation to bind a digital key to the digital door lock;

unlocking the digital key;

activating the digital door lock when the digital key is inserted into the digital door lock;

determining whether the digital key is bound to the digital door lock;

establishing a network link between the digital door lock and the digital key if the digital key is bound to the digital door lock;

determining whether the digital door lock is authorized by a remote authorization server; and performing an unlock operation on the digital door lock if the digital door lock is authorized by the remote authorization server.

2. The method of claim 1, further comprising:

pressing and holding a start button of the digital key for a fixed time to enable the digital key to enter a binding mode;

inserting the digital key into the digital door lock to activate the digital door lock;

determining, by the digital door lock, whether the digital key is an approved device according to a first hardware identification code of the digital key;

returning, by the digital door lock, a second hardware identification code to the digital key, if the digital key is the approved device, and establishing the network link between the digital key and the digital door lock;

sending, by the digital door lock, binding data to the remote authorization server to complete the binding operation as the network link has been established;

receiving, by the remote authorization server, the binding data and responding with a binding code to the digital door lock; and storing, by the digital door lock, the binding code and transmitting the binding code to the digital key.

3. The method of claim 1, further comprising:

activating the digital key by a biometric identification to enable the digital key to enter an unlocking mode.

4. The method of claim 1, further comprising:

rotating the digital key to activate the digital door lock when the digital key is completely inserted into the digital door lock and a positioning point of the digital key is pressed to a snap button of the digital door lock.

5. An authorization and unlocking system for a digital door lock executable by an electronic device, comprising:

a digital key, activated by a biometric identification;

the digital door lock, wherein the digital key and the digital door lock are bound according to a device binding operation; and a remote authorization server, wherein:

the digital key activates the digital door lock when the digital key is inserted into the digital door lock, the digital door lock determines whether the digital key is bound to the digital door lock, the digital door lock establishes a network link between the digital door lock and the digital key if the digital key is bound to the digital door lock, and the remote authorization server determines whether the digital door lock is authorized and performs an unlock operation on the digital door lock if the digital door lock is authorized.

6. The system of claim 5, wherein:

a start button of the digital key is pressed and held for a fixed time to enable the digital key to enter a binding mode, the digital key is inserted into the digital door lock to activate the digital door lock, the digital door lock determines whether the digital key is an approved device according to a first hardware identification code of the digital key, the digital door lock returns a second hardware identification code to the digital key, if the digital key is the approved device, and the network link between the digital key and the digital door lock is established, the digital door lock sends binding data to the remote authorization server to complete the binding operation as the network link has been established, the remote authorization server receives the binding data and responds with a binding code to the digital door lock, and the digital door lock stores the binding code and transmits the binding code to the digital key.

7. The system of claim 5, wherein:

the digital key is activated by the biometric identification to enable the digital key to enter an unlocking mode.

8. The system of claim 5, wherein:

the digital key is rotated to activate the digital door lock when the digital key is completely inserted into the digital door lock and a positioning point of the digital key is pressed to a snap button of the digital door lock.

9. An electronic device, comprising:

a binding module, configured to perform a device binding operation to bind a digital key with a digital door lock;

a detecting and activating module, configured to detect that the digital key is inserted into the digital door lock and activate the digital door lock, determine whether the digital key is a bound device, and, if the digital key is the bound device, establish a network link between the digital door lock and the digital key; and an unlocking module, configured to determine whether the digital door lock has been authorized by a remote authorization server, and if the authorization is successful, perform an unlocking operation on the digital door lock.

* * * * *